US011068287B2

(12) United States Patent
Petersen et al.

(10) Patent No.: US 11,068,287 B2
(45) Date of Patent: Jul. 20, 2021

(54) REAL-TIME GENERATION OF TAILORED RECOMMENDATIONS ASSOCIATED WITH CLIENT INTERACTIONS

(71) Applicant: BANK OF AMERICA CORPORATION, Charlotte, NC (US)

(72) Inventors: Malini Petersen, New York City, NY (US); Robert J. Graulich, West Hartford, CT (US); Richard M. Korzenko, Fort Mill, SC (US); Shola L. Oni, Atlanta, GA (US); Courtney Lee Prior, South Lyon, MI (US); Stephen Thomas Shannon, Charlotte, NC (US); Lea Marie Souther, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 23 days.

(21) Appl. No.: 16/293,160

(22) Filed: Mar. 5, 2019

(65) Prior Publication Data

US 2020/0285490 A1    Sep. 10, 2020

(51) Int. Cl.
*G06F 9/451* (2018.01)
*G06F 3/14* (2006.01)
(Continued)

(52) U.S. Cl.
CPC ............ *G06F 9/453* (2018.02); *G06F 3/1454* (2013.01)

(58) Field of Classification Search
CPC ........ G06F 9/453; G06F 3/1454; G06F 9/451; G06Q 30/0255; G06Q 10/10; G06Q 10/109; G09G 2354/00
See application file for complete search history.

(56) References Cited

U.S. PATENT DOCUMENTS 7,487,112 B2    2/2009 Barnes, Jr.
7,528,716 B2    5/2009 Jackson
(Continued)

OTHER PUBLICATIONS

Topic | Define Topic at Dictionary.com. (article) [online], Dictionary.com. Archived May 16, 2017. Retrieved on Sep. 1, 2020. https://www.dictionary.com/browse/topic?s=t (Year: 2017).*

(Continued)

*Primary Examiner* — John T Repsher, III
(74) *Attorney, Agent, or Firm* — Michael A. Springs; Moore & Van Allen PLLC; Nicholas C. Russell

(57) ABSTRACT

Embodiments of the present invention provide a system for real-time generation of tailored recommendations associated with client interactions. The system is configured to identify an interaction associated with an associate, extract information of a user associated with the interaction, transfer the extracted information to an associate device, transmit first set of control signals to the associate device, wherein the first set of control signals cause a graphical user interface of the associate device to display the extracted information to the associate, identify a type of the interaction, generate topics associated with the interaction based on the type of the interaction, transfer the topics to the associate device, and transmit a second set of control signals to the associate device, wherein the second set of control signals cause the graphical user interface of the associate device to display the one or more topics to the associate.

15 Claims, 6 Drawing Sheets

(51) Int. Cl.
    *G06Q 30/02* (2012.01)
    *G06Q 10/10* (2012.01)

(56) References Cited

U.S. PATENT DOCUMENTS

| | | | |
|---|---|---|---|
| 8,015,049 B1 | 9/2011 | Tam et al. | |
| 8,611,919 B2 | 12/2013 | Barnes, Jr. | |
| 8,671,009 B1 | 3/2014 | Coley et al. | |
| 8,880,047 B2 | 11/2014 | Konicek et al. | |
| 9,846,906 B1 | 12/2017 | Acharya et al. | |
| 10,127,564 B2 | 11/2018 | Heath | |
| 2002/0055924 A1 | 5/2002 | Liming | |
| 2005/0278207 A1* | 12/2005 | Ronnewinkel | G06Q 30/0281 705/326 |
| 2008/0140479 A1 | 6/2008 | Mello et al. | |
| 2009/0037306 A1 | 2/2009 | Hill | |
| 2010/0093396 A1 | 4/2010 | Roundtree | |
| 2011/0028160 A1 | 2/2011 | Roeding et al. | |
| 2011/0066615 A1 | 3/2011 | Pradhan et al. | |
| 2011/0082736 A1 | 4/2011 | Goldman et al. | |
| 2011/0196776 A1 | 8/2011 | Rash et al. | |
| 2012/0235812 A1 | 9/2012 | Maia et al. | |
| 2012/0239500 A1 | 9/2012 | Monahan | |
| 2013/0288706 A1 | 10/2013 | Yu et al. | |
| 2013/0332254 A1 | 12/2013 | Yu et al. | |
| 2014/0089098 A1 | 3/2014 | Roundtree | |
| 2014/0129622 A1* | 5/2014 | Michaeli | G06Q 10/10 709/203 |
| 2014/0258889 A1* | 9/2014 | Badge | G06F 16/954 715/760 |
| 2015/0006224 A1* | 1/2015 | Arditi | G06Q 10/06313 705/7.23 |
| 2018/0053193 A1 | 2/2018 | Charbonneau et al. | |

OTHER PUBLICATIONS

Tip | Define Tip at Dictionary.com. (article) [online], Dictionary.com. Archived May 28, 2017. Retrieved on Sep. 1, 2020. https://www.dictionary.com/browse/tip?s=t (Year: 2017).*

Tone| Definition of Tone by Merriam-Webster, (article) [online], Merriam-Webster. Archived Jul. 28, 2018. Retrieved on Sep. 1, 2020. https://www.merriam-webster.com/dictionary/tone (Year: 2018).*

* cited by examiner

REAL-TIME GENERATION OF TAILORED RECOMMENDATIONS ASSOCIATED WITH CLIENT INTERACTIONS

BACKGROUND

Present conventional systems do not have the capability to generate tailored recommendations associated with client interactions in real-time. Typically, present conventional systems provide standard recommendations present in a data store which may decrease the efficiency of the process. As such, there exists a need for a system to generate tailored recommendations associated with client interactions in real-time.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for creating and managing self-purgative electronic resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies a first interaction associated with an associate, wherein the first interaction is an upcoming interaction with a first user, extracts information associated with the first user, transfers the extracted information to an associate device, transmits first set of control signals to the associate device, wherein the first set of control signals cause the graphical user interface of the associate device to display the extracted information to the associate, identifies a type of the first interaction, generates one or more topics associated with the first interaction based on the type of the first interaction, transfers the one or more topics to the associate device, and transmit a second set of control signals to the associate device, wherein the second set of control signals cause the graphical user interface of the associate device to display the one or more topics to the associate.

In some embodiments, the present invention generates, in real-time, one or more tips during the first interaction with the first user based on one or more responses received during the first interaction with the first user and transmits a third set of control signals to the associate device, wherein the third set of control signals cause the graphical user interface of the associate device to display the one or more tips.

In some embodiments, the present invention generates one or more tone recommendations in real-time based on one or more responses received during the first interaction with the first user and transmits fourth set of control signals to the associate device, wherein the fourth set of control signals cause the graphical user interface of the associate device to display the one or more tone recommendations.

In some embodiments, the present invention prioritizes the one or more topics before transferring the one or more topics to the associate device, wherein the second set of control signals further comprise one or more visualization instructions to display the prioritization of the one or more topics.

In some embodiments, the present invention prioritizes the one or more topics based at least on the extracted information.

In some embodiments, the present invention receives screen sharing instructions from the associate during the first interaction, establishes a communication channel between the associate device and a user device of the first user, and projects, via the communication channel, one or more areas of the graphical user interface of the associate device onto the user device based on the screen sharing instructions received from the associate.

In some embodiments, the present invention automatically modifies the graphical user interface of the associate device excluding the one or more areas while projecting the one or more areas of the graphical user interface of the associate device onto the user device.

In some embodiments, the present invention automatically modifies the graphical user interface comprises generating and displaying at least one new topic on the graphical user interface.

In some embodiments, the present invention generates the at least one new topic based on one or more responses received from the first user during the first interaction.

In some embodiments, the present invention automatically modifies the graphical user interface comprises re-prioritizing the one or more topics based on the one or more responses received from the first user during the first interaction.

In some embodiments, the present invention categorizes and organizes one or more upcoming interactions of one or more associates.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
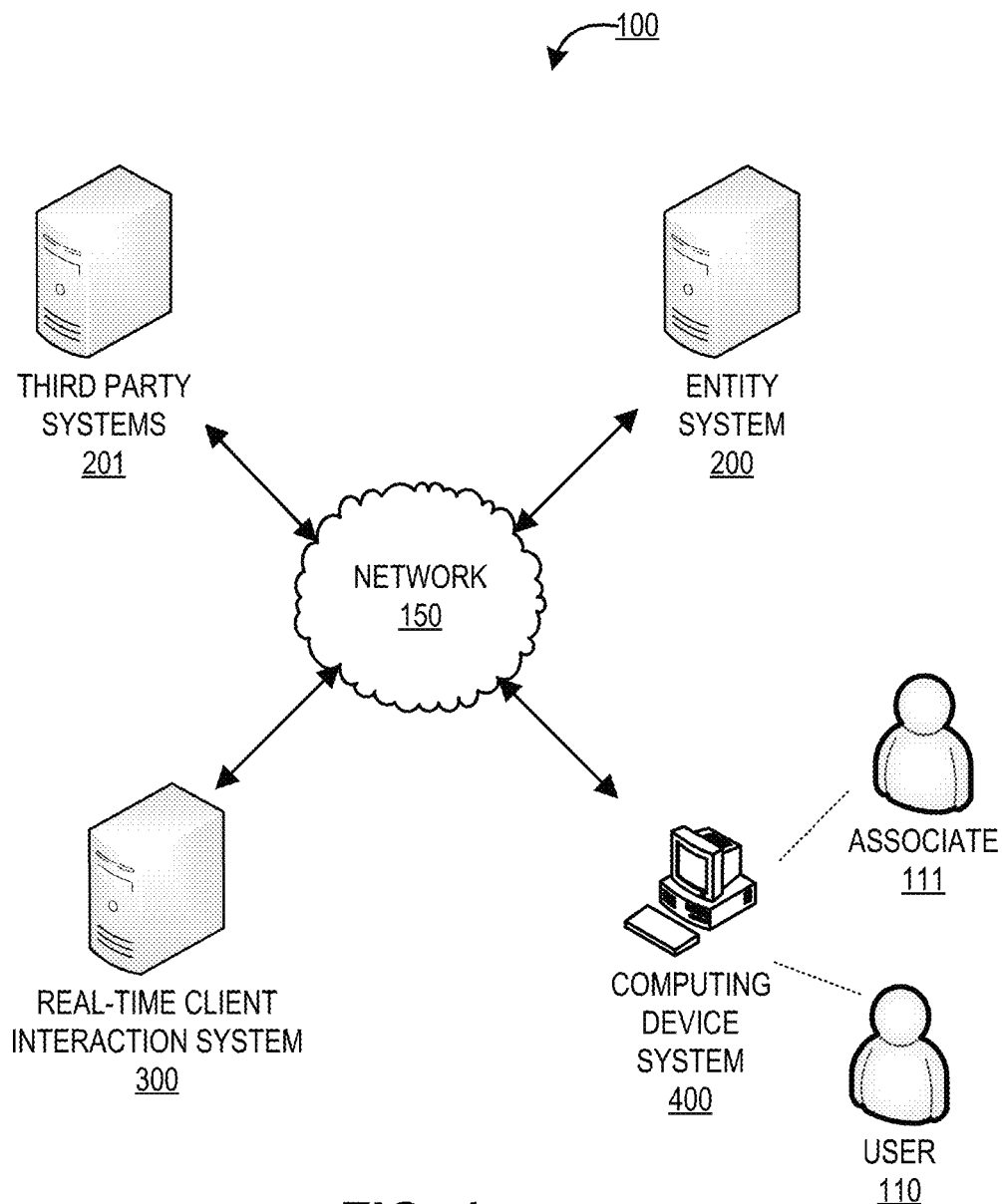
Figure 2:
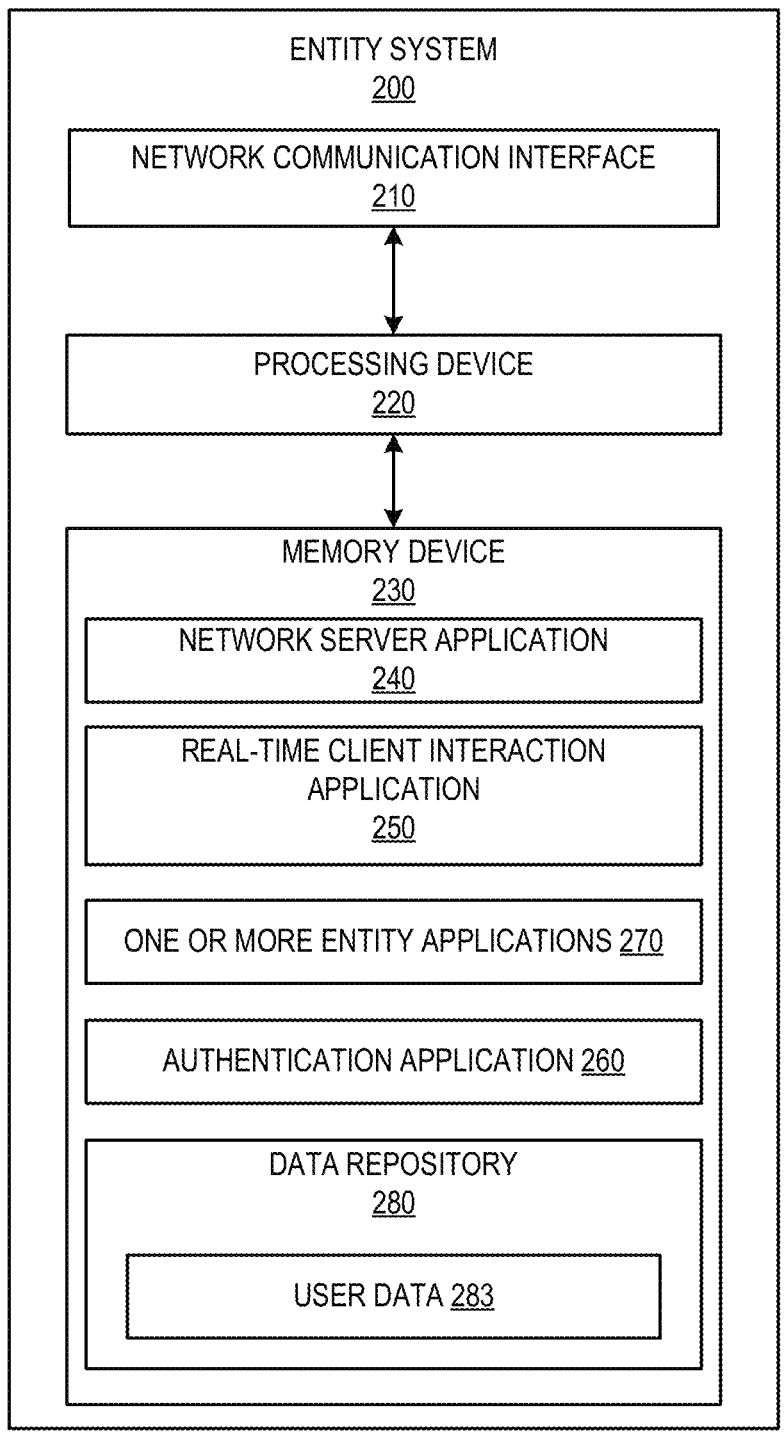
Figure 3:
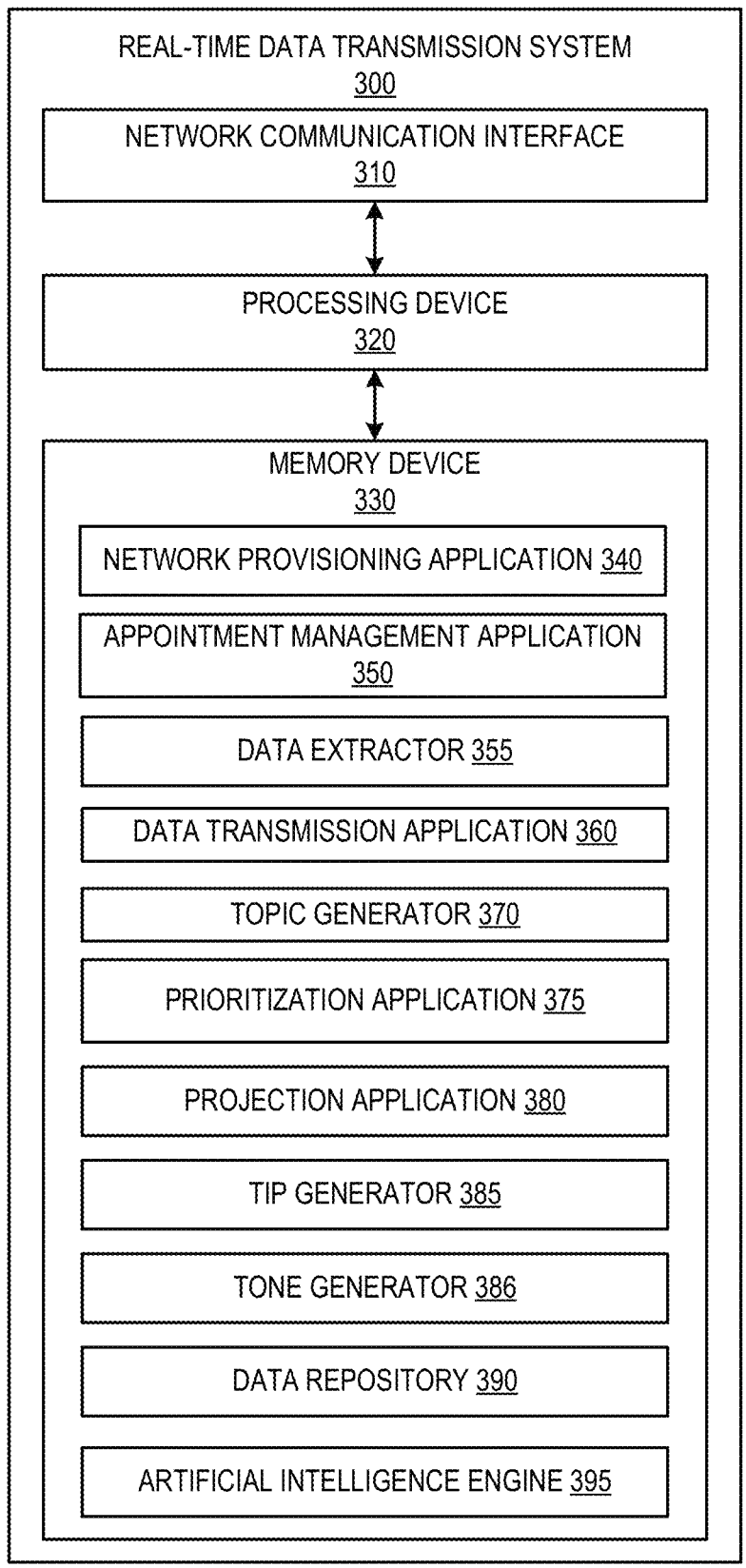
Figure 4:
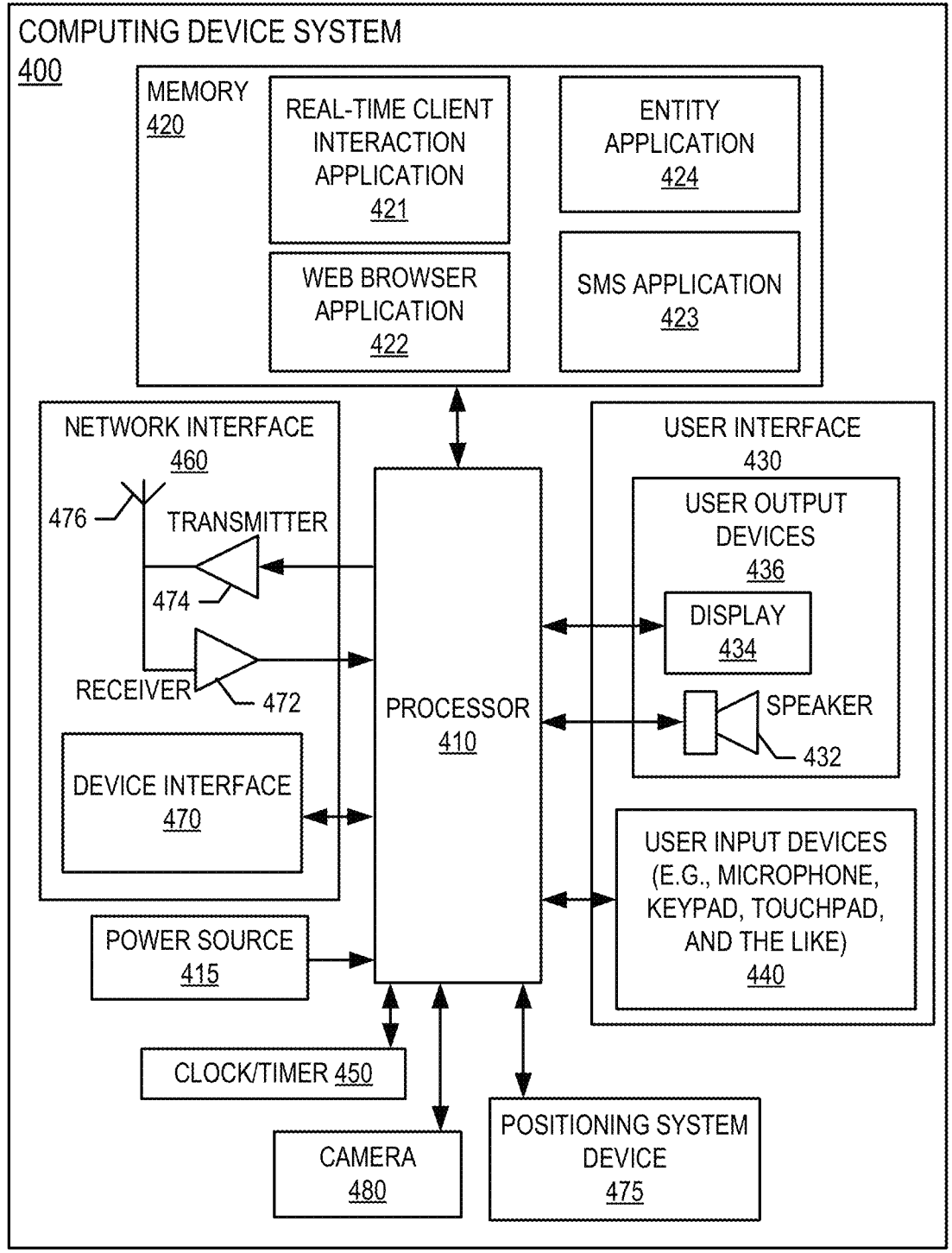
Figure 5:
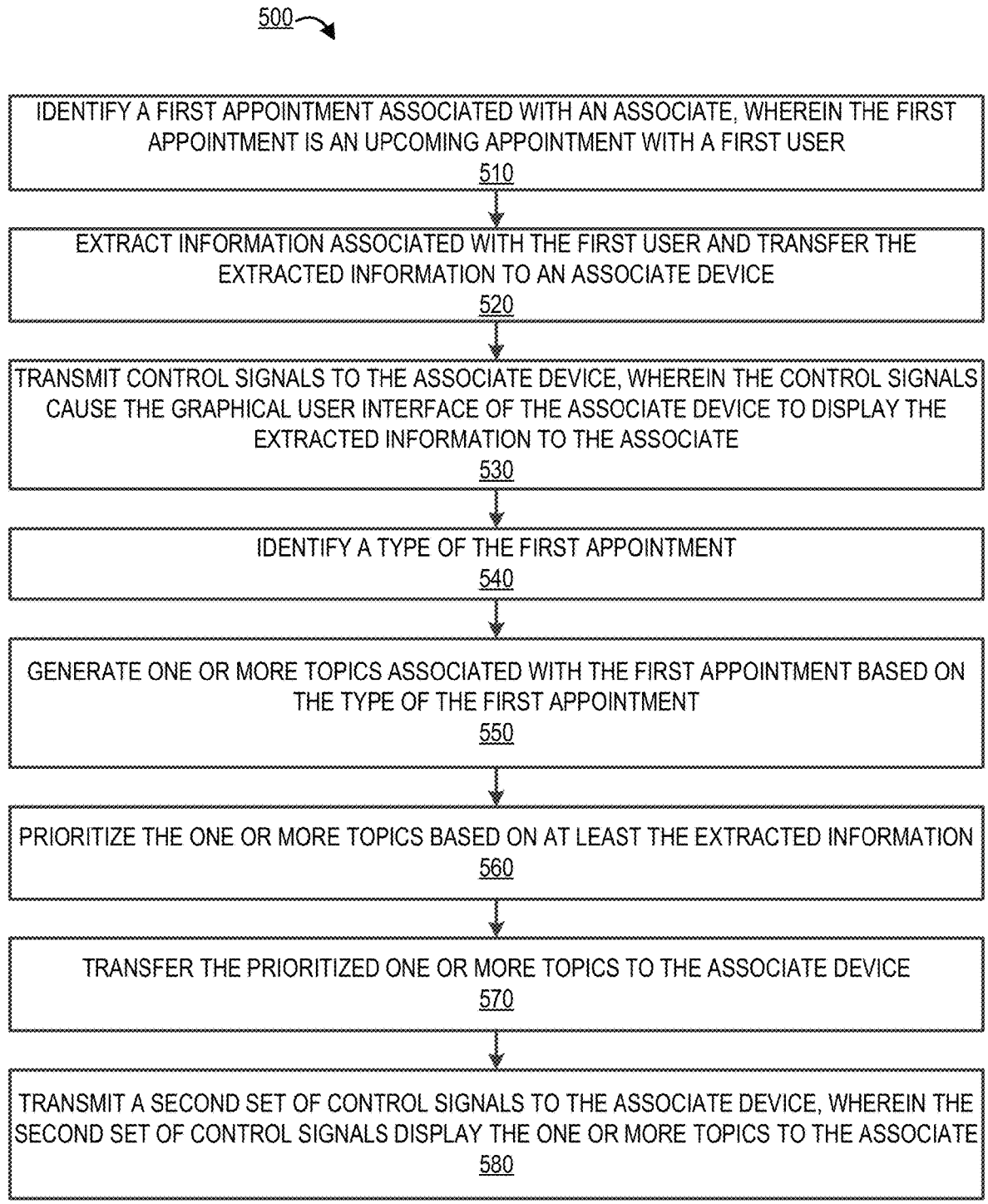
Figure 6:
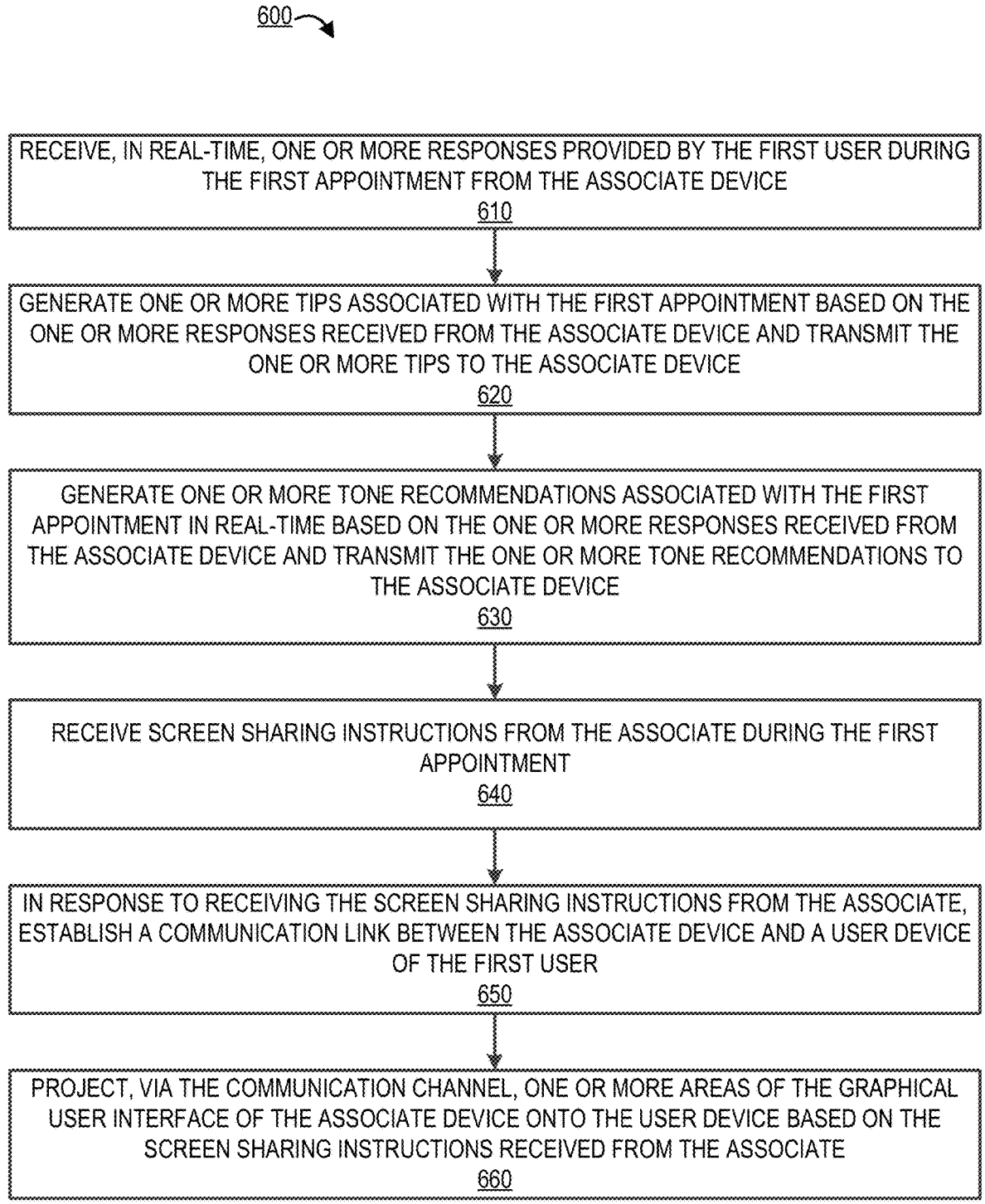

Having thus described embodiments of the invention in general terms, reference will now be made the accompanying drawings, wherein:

FIG. 1 provides a block diagram illustrating a system environment for facilitating efficient real-time client interactions, in accordance with an embodiment of the invention;

FIG. 2 provides a block diagram illustrating the entity system 200 of FIG. 1, in accordance with an embodiment of the invention;

FIG. 3 provides a block diagram illustrating a real-time client interaction system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for generating and prioritizing tailored recommendations prior to one or more interactions associated with an associate, in accordance with an embodiment of the invention; and FIG. 6 provides a flowchart illustrating a process flow for generating and transmitting tailored recommendations in real-time during the one or more interactions associated with an associate, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a or the like. The account is associated with and/or maintained by the entity.

Many of the example embodiments and implementations described herein contemplate interactions engaged in by a user with a computing device and/or one or more communication devices and/or secondary communication devices.

A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein. An "associate" as referenced herein, may refer to an employee, contractor, sub-contractor, or the like of the entity. As such, the associate may be a customer care representative, a financial analyst, a financial advisor, investment portfolio manager, or the like.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 provides a block diagram illustrating a system environment 100 for facilitating efficient real-time client interactions, in accordance with an embodiment of the invention. As illustrated in FIG. 1, the environment 100 includes a real-time client interaction system 300, entity system 200, a computing device system 400, and one or more third party systems 201. One or more users 110 and one or more associates 111 may be included in the system environment 100, where the users 110 and associates 111 interact with the other entities of the system environment 100 via a user interface of the computing device system 400. In some embodiments, the one or more user(s) 110 of the system environment 100 may be customers of an entity associated with the entity system 200. In some embodiments, the one or more associate(s) 111 of the system environment 100 may be employees of the entity associated with the entity system 200.

The entity system(s) 200 may be any system owned or otherwise controlled by an entity to support or perform one or more process steps described herein. The entity may be any organization which develops or manages applications. In some embodiments, the managing entity is a financial institution. In some embodiments, the managing entity is a non-financial institution.

The real-time client interaction system 300 is a system of the present invention for performing one or more process steps described herein. In some embodiments, the real-time client interaction system 300 may be an independent system. In some embodiments, the real-time client interaction system 300 may be a part of the entity system 200.

The real-time client interaction system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the real-time client interaction system 300 is configured to communicate information or instructions with the entity system 200, the computing device system 400, and/or the third party systems 201 across the network 150.

The computing device system 400 may be a system owned or controlled by the entity of the entity system 200, the user 110, the associate 111, and/or a third party that specializes in processing of the resource distribution applications in the system environment 100. As such, the computing device system 400 may be a computing device of the user 110 or a computing device of the associate 111. In general, the computing device system 400 communicates with the user 110 via a user interface of the computing device system 400, and in turn is configured to communicate information or instructions with the real-time client interaction system 300, entity system 200, and/or the third party systems 201 across the network 150. In come embodiments, the computing device system 400 communicates with the associate 111 via a user interface (referred to as associate interface below) of the computing device system 400, and in turn is configured to communicate information or instructions with the real-time client interaction system 300, entity system 200, and/or the third party systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a real-time client interaction application 250, one or more entity applications 270, an authentication application 260, and a data repository 280 comprises user data 283. The computer-executable program code of the network server application 240, the real-time client interaction application 250, the one or more entity applications 270, and the authentication application 260 to perform certain logic, data-extraction, and data-storing functions of the entity system 200 described herein, as well as communication functions of the entity system 200.

The network server application 240, the real-time client interaction application 250, the one or more entity applications 270, and the authentication application 260 are configured to store data in the data repository 280 or to use the data stored in the data repository 280 when communicating through the network communication interface 210 with the real-time client interaction system 300, the computing device system 400, and/or the third party systems 201 to perform one or more process steps described herein. In some embodiments, the entity system 200 may receive instructions from the real-time client interaction system 300 via the real-time client interaction application 250 to perform certain operations. The real-time data transmission application 250 may be provided by the real-time client interaction system 300. The one or more entity applications 270 may be any of the applications used, created, modified, and/or managed by the entity system 200. The authentication application 260 may be used to authenticate one or more users 110 to access the one or more entity applications 270 and the data repository 280.

FIG. 3 provides a block diagram illustrating the real-time client interaction system 300 in greater detail, in accordance with embodiments of the invention. As illustrated in FIG. 3, in one embodiment of the invention, the real-time client interaction system 300 includes one or more processing devices 320 operatively coupled to a network communication interface 310 and a memory device 330. In certain embodiments, the real-time client interaction system 300 is operated by a first entity, such as a financial institution, while in other embodiments, the real-time client interaction system 300 is operated by an entity other than a financial institution. In some embodiments, the real-time client interaction system 300 is owned or operated by the entity of the entity system 200. In some embodiments, the real-time client interaction system 300 may be an independent system. In alternate embodiments, the real-time client interaction system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the real-time client interaction system 300 described herein. For example, in one embodiment of the real-time client interaction system 300, the memory device 330 includes, but is not limited to, a network provisioning application 340, an appointment management application 350, a data extractor 355, a data transmission application 360, a topic generator 370, prioritization application 375, a projection application 380, a tip generator 385, a tone generator 386, an artificial intelligence engine 395, and a data repository 390 comprising data processed or accessed by one or more applications in the memory device 330. The computer-executable program code of the network provisioning application 340, the network provisioning application 340, the appointment management application 350, the data extractor 355, the data transmission application 360, the topic generator 370, the prioritization application 375, the projection application 380, the tip generator 385, a tone generator 386, and the artificial intelligence engine 395 may instruct the processing device 320 to perform certain logic, data-processing, and data-storing functions of the real-time client interaction system 300 described herein, as well as communication functions of the real-time client interaction system 300.

The network provisioning application 340, the network provisioning application 340, the appointment management application 350, the data extractor 355, the data transmission application 360, the topic generator 370, the prioritization application 375, the projection application 380, the tip generator 385, the tone generator 386, and the artificial intelligence engine 395 are configured to invoke or use the data in the data repository 390 when communicating through the network communication interface 310 with the entity system 200, the computing device system 400, and/or the third party systems 201. In some embodiments, the network provisioning application 340, the network provisioning application 340, the appointment management application 350, the data extractor 355, the data transmission application 360, the topic generator 370, the prioritization application 375, the projection application 380, the tip generator 385, the tone generator 386, and the artificial intelligence engine 395 may store the data extracted or received from the entity system 200, the third party system 201, and the computing device system 400 in the data repository 390. In some embodiments, the network provisioning application 340, the network provisioning application 340, the appointment management application 350, the data extractor 355, the data transmission application 360, the topic generator 370, the prioritization application 375, the projection application 380, the tip generator 385, the tone generator 386, and the artificial intelligence engine 395 may be a part of a single application.

In some embodiments, the appointment management application 350 manages the one or more appointments associated with the associate 111. In some embodiments, the data extractor 355 extracts data from the entity system 200, the computing device system 400, and the third party entity systems, where the data may include resource pool information of the user, user information, information provided by an associate in the previous interactions, and the like. In some embodiments, the data transmission application 360 transmits the data extracted by the data extractor 355 and other data generated by the other application of the real-time client interaction system 300 to the computing device system 400. In some embodiments, the data transmission application 360 transmits one or more control signals to transform the graphical user interface of the computing device system 400 of the user 110 and/or the associate. In some embodiments, the topic generator 370 generates one or more topics associated with the one or more appointments. In some embodiments, the prioritization application 375 prioritizes the one or more topics generated by the topic generator 370. In some embodiments, the projection application 380 projects one or more areas of the associate interface on the computing device system 400 of the associate 111 onto the computing device system 400 of the user 110. In some embodiments, the tip generator 385 may generate one or more tips associated with the one or more interactions. In some embodiments, the tone generator generates one or more tone recommendations associated with the one or more interactions. In some embodiments, the artificial intelligence engine 395 generates the one or more topics, the one or more tips, one or more follow-up questions, one or more tone recommendations based on the information associated with the user 110 and/or responses provided by the user 110 during the interaction. One or more processes performed by the network provisioning application 340, the network provisioning application 340, the appointment management application 350, the data extractor 355, the data transmission application 360, the topic generator 370, the prioritization application 375, the projection application 380, the tip generator 385, the tone generator 386, and the artificial intelligence engine 395 are described in detail below.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 and/or the associate 111 may include any of a number of devices allowing the computing device system 400 to receive data from the user 110 and/or the associate 111, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/ code executed by the processor 410 to implement the functions of the computing device system 400 and/or one or more of the process/method steps described herein. For example, the memory 420 may include such applications as a conventional web browser application 422, a real-time data transmission application 421, entity application 424. These applications also typically instructions to a graphical user interface (GUI) on the display 430 that allows the user 110 and/or the associate 111 to interact with the entity system 200, the real-time client interaction system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the real-time data transmission application 421 provided by the real-time client interaction system 300 allows the user 110 and/or the associate 111 to access the one or more electronic resources stored in the entity system and/or the real-time client interaction system 300. In some embodiments, the entity application 424 provided by the entity system 200 and the real-time data transmission application 421 allow the user 110 to access one or more electronic resources and one or more entity applications 270.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow 500 for generating and prioritizing tailored recommendations prior to one or more interactions associated with an associate, in accordance with an embodiment of the invention. As shown in block 510, the system identifies a first interaction associated with an associate, wherein the first interaction is an upcoming interaction with a first user. An "associate" as described above may be any of the employees of an entity. In some embodiments of the invention, the associate may be a customer care representative, a financial advisor, a financial analyst, or the like. A "user" may be a customer of the entity who has one or more resource pools with the entity. The term "appointment" or "interaction" may be any type of interaction between an associate and a customer of the entity. In some embodiments, appointment may be a face to face appointment. In some embodiments, appointment may be an online appointment. In some embodiments, appointment may be a telephonic appointment. There may be one or more interactions associated with each associate of the entity.

As shown in block 520, the system extracts information associated with the first user and transfers the extracted information to an associate device. In response to identifying the first interaction which is an upcoming interaction, the system extracts user information including, but not limited to, resource information (e.g., loans, deposits, savings, spending habits, investments, transaction insights, or the like), supplemental resource information (e.g., rewards, targeted offers, or the like), resource interaction insights (e.g., higher spending on gas, higher spending on coffee, number of subscriptions, higher or the like), resource payment insights (e.g., higher payment towards home insurance, or the like), and life plan information (e.g., life priorities, life events, and the like). The system after extracting information associated with the first user, transfers the extracted information to the associate device. The associate device may be any computing device system such as a mobile device, tablet, desktop, or the like. As shown in block 530, the system may then transfer first set of control signals to the associate device, where the first set of control signals that cause the graphical user interface of the associate device to display the extracted information to the associate. Various categorization and visualization techniques may be utilized by the system to display the extracted information. For example, the system may show higher payment towards home insurance in red. In another example, the system may show higher payment towards home insurance using an animation.

As shown in block 540, the system identifies a type of the first interaction. In some embodiments, the type of the interaction may be a purpose of the appointment. For example, the first user may book an appointment with the associate to open a savings account. As shown in block 550, the system generates one or more topics associated with the first appointment based on the type of the first appointment. Continuing with the previous example, the system in response to identifying that the first user booked an appointment to open a savings account, may create one or more topics such as enrolling in one or more savings programs, ways to save, enrolling in automatic transfers, suggesting different merchants or vendors associated with payments that are higher than usual, or the like.

As shown in block 560, the system prioritizes the one or more topics based on at least the extracted information. In some embodiments, the system generates the one or more topics and prioritizes the topics based on the importance to the first interaction. Continuing with the previous example, the system generates one or more topics associated with the opening of the savings account as enrolling in one or more savings programs, ways to save, enrolling in automatic transfers, suggesting different merchants or vendors and may assign highest priority to enrolling in automatic transfers.

As shown in block 570, the system transfers the prioritized one or more topics to the associate. As shown in block 580, the system transmits a second set of control signals, wherein the second set of control signals cause the graphical user interface of the associate device to display the prioritized one or more topics to the associate. The system may display the prioritization using one or more visualization techniques. For example, the system may show the topic that is of highest priority in red. In another example, the system may show the prioritization of the one or more topics in the form of an interactive map with the first location in the interactive map being a topic of the one or more topics that is assigned a highest priority.

FIG. 6 provides a flowchart illustrating a process flow 600 for generating and transmitting tailored recommendations in real-time during the one or more interactions associated with an associate, in accordance with an embodiment of the invention. As shown in block 610, the system receives in real-time, one or more responses provided by the first user during the first interaction from the associate device. In some embodiments, the system may provide an associate interface with one or more options including, but not limited to, one or more upcoming interactions, user information of users associated with the one or more upcoming interactions, and other data associated with the one or more interactions. In some embodiments, the system may provide an option to the associate to record the conversations with the users during the one or more interactions. In some embodiments, the system may provide an option to the associate to provide comments associated with the one or more interactions during the one or more interactions. As such, during the first interaction, the associate may submit one or more comments associated with one or more responses provided by the first user.

As shown in block 620, the system generates one or more tips associated with the first interaction based on the one or more responses received from the associate device and transfers the one or more tips to the associate device. The one or more tips may be any suggestions associated with the conversation with the first user. For example, the system identifies that the first user is interested in buying stocks, the system may provide the one or more tips to the associate to provide more information associated with the stocks. In some embodiments, the system may generate one or more follow-up questions based on the one or more responses received from the associate device and may transfer the follow-up questions to the associate interface during the first interaction.

As shown in block 630, the system generates one or more tone recommendations associated with the first interaction in real-time based on the one or more responses received from the associate device and transmits the one or more tone recommendations to the associate device. The one or more tone recommendations may include neutral, joyful, formal, or the like. For example, the system may identify that the first user is talking about caregiving and generate and transmit a "neutral" tone recommendation.

As shown in block 640, the system receives screen sharing instructions from the associate during the first interaction. Screen sharing instructions may include selecting an area of the associate interface, selecting at least two different areas of the associate interface, or the like. The screen sharing instructions may also include identity of a user device of the first user. As shown in block 650, the system in response to receiving the screen sharing instructions from the associate, establishes a communication link between the associate device and a user device of the first user. The communication link established by the system acts as a bridge connection between the associate interface and the user device.

As shown in block 660, the system projects, via the communication channel, one or more areas of the graphical user interface of the associate device onto the user device based on the screen sharing instructions received from the associate. The system projects the one or more areas selected by the associate. In some embodiments, where the system dynamically generates and transmits the one or more tips, the one or more follow-up questions, and the one or more tone recommendations onto the user device, the system transforms the associate interface excluding the one or more areas that are projected onto the user device. In some embodiments, the system may re-prioritize the one or more topics based on the one or more responses received from the first user and the system may transform the associate interface on the associate device excluding the one or more areas that are projected onto the user device to display the reprioritization of the one or more topics.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for real-time generation of tailored recommendations associated with client interactions, the system comprising:
   at least one non-transitory storage device; and
   at least one processing device coupled to the at least one non-transitory storage device, wherein the at least one processing device is configured to:
      identify a first interaction associated with an associate, wherein the first interaction is an upcoming interaction with a first user;
      extract information associated with the first user;
      transfer the extracted information to an associate device;
      transmit a first set of control signals to the associate device, wherein the first set of control signals cause a graphical user interface of the associate device to display the extracted information to the associate;
      identify a type of the first interaction;
      generate one or more topics associated with the first interaction based on the type of the first interaction;
      transfer the one or more topics to the associate device;
      transmit a second set of control signals to the associate device, wherein the second set of control signals cause the graphical user interface of the associate device to display the one or more topics to the associate;
      generate, in real-time, one or more tips during the first interaction with the first user based on one or more responses received during the first interaction with the first user;

transmit a third set of control signals to the associate device, wherein the third set of control signals cause the graphical user interface of the associate device to display the one or more tips;

generate one or more tone recommendations in real-time based on the one or more responses received during the first interaction with the first user, wherein the one or more tone recommendations comprise at least one of a neutral tone, a joyful tone, and a formal tone;

transmit a fourth set of control signals to the associate device, wherein the fourth set of control signals cause the graphical user interface of the associate device to display the one or more tone recommendations;

receive screen sharing instructions from the associate;

project, via a communication channel, one or more areas of the graphical user interface of the associate device onto a user device of the first user based on the screen sharing instructions received from the associate;

reprioritize the one or more topics in real-time based on the one or more responses received during the first interaction with the first user; and transmit a fifth set of control signals to the associate device, wherein the fifth set of control signals transform the graphical user interface of the associate device excluding the one or more areas projected onto the user device to display reprioritization of the one or more topics.

2. The system of claim 1, wherein the at least one processing device is further configured to:
generate one or more follow-up questions in real-time based on the one or more responses received during the first interaction with the first user; and
transmit a sixth set of control signals to the associate device, wherein the sixth set of control signals cause the graphical user interface of the associate device to display the one or more follow-up questions.

3. The system of claim 1, wherein the at least one processing device is further configured to:
in response to receiving the screen sharing instructions from the associate during the first interaction, establish the communication channel between the associate device and the user device of the first user.

4. The system of claim 3, wherein the at least one processing device is further configured to automatically modify the graphical user interface of the associate device excluding the one or more areas while projecting the one or more areas of the graphical user interface of the associate device onto the user device.

5. The system of claim 4, wherein automatically modifying the graphical user interface comprises generating and displaying at least one new topic on the graphical user interface.

6. The system of claim 5, wherein the at least one processing device is configured to generate the at least one new topic based on the one or more responses received from the first user during the first interaction.

7. The system of claim 1, wherein the at least one processing device is configured to categorize and organize one or more upcoming interactions of one or more associates.

8. A computer program product for real-time generation of tailored recommendations associated with client interactions, the computer program product comprising a non-transitory computer-readable storage medium having computer executable instructions for causing a computer processor to perform the steps of:

identifying a first interaction associated with an associate, wherein the first interaction is an upcoming interaction with a first user;

extracting information associated with the first user;

transferring the extracted information to an associate device;

transmitting a first set of control signals to the associate device, wherein the first set of control signals cause a graphical user interface of the associate device to display the extracted information to the associate;

identifying a type of the first interaction;

generating one or more topics associated with the first interaction based on the type of the first interaction;

transferring the one or more topics to the associate device;

transmitting a second set of control signals to the associate device, wherein the second set of control signals cause the graphical user interface of the associate device to display the one or more topics to the associate;

generating, in real-time, one or more tips during the first interaction with the first user based on one or more responses received during the first interaction with the first user;

transmitting a third set of control signals to the associate device, wherein the third set of control signals cause the graphical user interface of the associate device to display the one or more tips;

generating one or more tone recommendations in real-time based on the one or more responses received during the first interaction with the first user, wherein the one or more tone recommendations comprise at least one of a neutral tone, a joyful tone, and a formal tone;

transmitting a fourth set of control signals to the associate device, wherein the fourth set of control signals cause the graphical user interface of the associate device to display the one or more tone recommendations;

receiving screen sharing instructions from the associate;

projecting, via a communication channel, one or more areas of the graphical user interface of the associate device onto a user device of the first user based on the screen sharing instructions received from the associate;

reprioritizing the one or more topics in real-time based on the one or more responses received during the first interaction with the first user; and transmitting a fifth set of control signals to the associate device, wherein the fifth set of control signals transform the graphical user interface of the associate device excluding the one or more areas projected onto the user device to display reprioritization of the one or more topics.

9. The computer program product of claim 8, wherein the computer executable instructions further cause the computer processor to:
generate one or more follow-up questions in real-time based on the one or more responses received during the first interaction with the first user; and
transmit a sixth set of control signals to the associate device, wherein the sixth set of control signals cause the graphical user interface of the associate device to display the one or more follow-up questions.

10. The computer program product of claim 8, wherein the computer executable instructions further cause the computer processor to:

in response to receiving the screen sharing instructions from the associate during the first interaction, establish the communication channel between the associate device and the user device of the first user.

11. The computer program product of claim 10, wherein the computer executable instructions further cause the computer processor to automatically modify the graphical user interface of the associate device excluding the one or more areas while projecting the one or more areas of the graphical user interface of the associate device onto the user device.

12. A computerized method for real-time generation of tailored recommendations associated with client interactions, the method comprising:
   identifying a first interaction associated with an associate, wherein the first interaction is an upcoming interaction with a first user;
   extracting information associated with the first user;
   transferring the extracted information to an associate device;
   transmitting a first set of control signals to the associate device, wherein the first set of control signals cause a graphical user interface of the associate device to display the extracted information to the associate;
   identifying a type of the first interaction;
   generating one or more topics associated with the first interaction based on the type of the first interaction;
   transferring the one or more topics to the associate device;
   transmitting a second set of control signals to the associate device, wherein the second set of control signals cause the graphical user interface of the associate device to display the one or more topics to the associate;
   generating, in real-time, one or more tips during the first interaction with the first user based on one or more responses received during the first interaction with the first user;
   transmitting a third set of control signals to the associate device, wherein the third set of control signals cause the graphical user interface of the associate device to display the one or more tips;
   generating one or more tone recommendations in real-time based on the one or more responses received during the first interaction with the first user, wherein the one or more tone recommendations comprise at least one of a neutral tone, a joyful tone, and a formal tone;
   transmitting a fourth set of control signals to the associate device, wherein the fourth set of control signals cause the graphical user interface of the associate device to display the one or more tone recommendations;
   receiving screen sharing instructions from the associate;
   projecting, via a communication channel, one or more areas of the graphical user interface of the associate device onto a user device of the first user based on the screen sharing instructions received from the associate;
   reprioritizing the one or more topics in real-time based on the one or more responses received during the first interaction with the first user; and
   transmitting a fifth set of control signals to the associate device, wherein the fifth set of control signals transform the graphical user interface of the associate device excluding the one or more areas projected onto the user device to display reprioritization of the one or more topics.

13. The computerized method of claim 12, wherein the method further comprises:
   generating, in real-time, one or more follow-up questions during the first interaction with the first user based on the one or more responses received during the first interaction with the first user; and
   transmitting a sixth set of control signals to the associate device, wherein the sixth set of control signals cause the graphical user interface of the associate device to display the one or more follow-up questions.

14. The computerized method of claim 12, wherein the method further comprises:
   in response to receiving the screen sharing instructions from the associate during the first interaction, establishing the communication channel between the associate device and the user device of the first user.

15. The computerized method of claim 12, wherein the method further comprises automatically modifying the graphical user interface of the associate device excluding the one or more areas while projecting the one or more areas of the graphical user interface of the associate device onto the user device.

* * * * *